United States Patent
Kumar et al.

(10) Patent No.: US 7,130,890 B1
(45) Date of Patent: Oct. 31, 2006

(54) METHOD AND SYSTEM FOR ADAPTIVELY PREFETCHING OBJECTS FROM A NETWORK

(75) Inventors: Rajendra Kumar, Los Altos, CA (US); Sujoy Basu, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 829 days.

(21) Appl. No.: 10/235,116

(22) Filed: Sep. 4, 2002

(51) Int. Cl.
*G06F 15/16* (2006.01)
*G06F 1/12* (2006.01)

(52) U.S. Cl. .................. 709/218; 707/10; 713/400; 709/203

(58) Field of Classification Search .............. None
See application file for complete search history.

(56) References Cited

U.S. PATENT DOCUMENTS

| | | | |
|---|---|---|---|
| 5,941,981 A * | 8/1999 | Tran .......................... 712/207 |
| 6,023,726 A | 2/2000 | Saksena | |
| 6,085,193 A * | 7/2000 | Malkin et al. ................ 707/10 |
| 6,098,064 A * | 8/2000 | Pirolli et al. .................. 707/2 |
| 6,182,133 B1 * | 1/2001 | Horvitz ...................... 709/223 |
| 6,728,840 B1 * | 4/2004 | Shatil et al. ................ 711/137 |
| 2002/0069375 A1 * | 6/2002 | Bowen ....................... 713/400 |

* cited by examiner

*Primary Examiner*—Wen-Tai Lin

(57) ABSTRACT

A method and system for adaptively prefetching objects from a network has been disclosed. The invention includes adaptively tuning a prefetch engine to prefetch a plurality of objects from within the network. Because the prefetch engine is adaptively tuned, the prefetch process is optimized, thereby reducing the number of idle cycles that would otherwise be required to retrieve objects from the network. The method and system includes monitoring at least one proxy server within the network, the at least one proxy server comprising a prefetch engine and adaptively tuning the prefetch engine to prefetch a plurality of objects from within the network.

33 Claims, 6 Drawing Sheets

Monitoring a proxy server within the network wherein the proxy server includes a prefetch engine.
210

Adaptively tuning the prefetch engine to prefetch a plurality objects from within the network.
220

Monitoring a proxy server within the network wherein the proxy server includes a prefetch engine.
210

Adaptively tuning the prefetch engine to prefetch a plurality objects from within the network.
220

| Object Name | Object Size | Object Usage Count | Object Download time | Object Age | Last Use Time | .... |
|---|---|---|---|---|---|---|
| O27 | X | X | x | X | x | X |
| O4 | X | X | x | X | x | X |
| O2 | X | X | x | X | x | x |
|  |  |  |  |  |  |  |
| O5 | X | X | x | X | x | x |
| O2 | X | X | x | X | x | x |
| O3 | X | X | x | X | x | x |
| O1 | X | X | x | X | x | x |
|  |  |  |  |  |  |  |
| O2 | X | X | x | X | x | x |
| O20 | X | X | x | X | x | x |
| O15 | X | X | x | X | x | x |
| O2 | X | X | x | X | x | x |
|  |  |  |  |  |  |  |
|  |  |  |  |  |  |  |
|  |  |  |  |  |  |  |
|  |  |  |  |  |  |  |

| Object Name | Object Size | Object Usage Count | Object Download time | Object Age | Last Use Time | .... |
|---|---|---|---|---|---|---|
| O27 | X | X | x | X | x | X |
| O4 | X | X | x | X | x | X |
| O2 | X | X | x | X | x | x |
|  |  |  |  |  |  |  |
| O5 | X | X | x | X | x | x |
| O2 | X | X | x | X | x | x |
| O3 | X | X | x | X | x | x |
| O1 | X | X | x | X | x | x |
|  |  |  |  |  |  |  |
| O2 | X | X | x | X | x | x |
| O20 | X | X | x | X | x | x |
| O15 | X | X | x | X | x | x |
| O2 | X | X | x | X | x | x |
|  |  |  |  |  |  |  |
|  |  |  |  |  |  |  |
|  |  |  |  |  |  |  |
|  |  |  |  |  |  |  | t1, t2, Future

Figure 6

METHOD AND SYSTEM FOR ADAPTIVELY PREFETCHING OBJECTS FROM A NETWORK

FIELD OF INVENTION

The present invention relates generally to the field of computer networks and more particularly to a method and system for adaptively prefetching objects from a network.

BACKGROUND OF THE INVENTION

Computers have become an integral tool used in a wide variety of different applications, such as in finance and commercial transactions, three-dimensional and real-time graphics, computer-aided design and manufacturing, healthcare, telecommunications, education, etc. Computers are finding new applications as performance and speeds ever increase while costs decrease due to advances in hardware technology and rapid software development. Furthermore, the functionality and usefulness of a computer system can be dramatically enhanced by coupling stand-alone computers together to form a computer network. In a computer network, users may readily exchange files, share information stored on a common database, pool resources, communicate via e-mail and even video teleconference.

One popular type of network setup is known as the "client/server" computing network. Basically, users perform tasks through their own dedicated desktop computer (i.e., the "client") and the desktop computer is networked to larger, more powerful central computers (i.e., "servers"). Servers are high-speed machines that hold programs and data shared by network users. For a better understanding of a client/server computer network, please refer now to FIG. 1. FIG. 1 shows a conventional client/server computer network 100. The network 100 includes a plurality of client computers 101–106 coupled to a network of remote server computers 110.

An assortment of network and database software enables communication between the various clients and the servers. Hence, in a client/server arrangement, the data is easily maintained because it is stored in one location and maintained by the servers; the data can be shared by a number of local or remote clients; the data is easily and quickly accessible; and clients may readily be added or removed.

In today's networking environment, many clients desire higher bandwidth and lower latency (delay between the request and the responses) to access many web and streaming media applications. This can be accomplished by providing caching servers at more local points in the network that keep copies of files previously retrieved from the remote servers for subsequent repeated access by the local clients. The theory underlying caching is that since the same file may be used more than once, it may be more efficient (both in terms of speed and resource utilization) to keep a copy locally rather than retrieve it a second time from a remote source. Typically, each caching server caches a small set of "hot" recently accessed objects in a fast and relatively expensive random access memory attached to its internal bus, and a somewhat larger set of such objects in a slower and cheaper random access peripheral storage device such as a magnetic or optical disk.

Prefetching is a known technique for analyzing current and/or past file requests to predict what files are likely to be requested in the future. Those predictions are then utilized to retrieve files from a remote server on a less urgent basis before they are actually requested, thereby reducing not only latency but also network congestion. It differs from caching in that the focus is not on whether to keep a local copy of a file that has already been retrieved or updated (which is mostly a question of how best to use the available local storage capacity) but rather on whether to obtain from the remote server a file that is not currently available locally and that is not currently the subject of any pending requests. Since predicting what files are likely to be requested in the future involves a plethora of prediction criteria, it is desirable that these predictions be completed as comprehensively and efficiently as possible.

Accordingly, what is needed is a method and system for prefetching objects from a network in a comprehensive and efficient fashion. The method and system should be simple, cost effective and capable of being easily adapted to existing technology. The present invention addresses these needs.

SUMMARY OF THE INVENTION

A method and system for adaptively prefetching objects from a network has been disclosed. The invention includes adaptively tuning a prefetch engine to prefetch a plurality of objects from within the network. Because the prefetch engine is adaptively tuned, the prefetch process is optimized, thereby reducing the number of idle cycles that would otherwise be required to retrieve objects from the network.

A first aspect of the present invention is a method and system for adaptively prefetching objects from a network. The method and system include monitoring at least one proxy server within the network, the at least one proxy server including a prefetch engine and adaptively tuning the prefetch engine to prefetch a plurality of objects from within the network.

Another aspect of the present invention is a network proxy server. The network proxy server includes a prefetch engine for prefetching a plurality of objects from within the network, a replacement engine for replacing at least one of a plurality of objects in the proxy based on a predetermined set of criteria and a data mining engine capable of adaptively tuning the prefetch engine to prefetch a plurality of objects from within the network.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 2 is a high-level flowchart of the method in accordance with an embodiment of the present invention.

FIG. 5 shows an example of a plurality of access logs in accordance with an embodiment of the present invention.

FIG. 6 shows the access logs wherein two time slices are identified.

DETAILED DESCRIPTION OF THE INVENTION

The present invention relates to a method and system for prefetching objects from a network. While the invention is described in the general context of an application program that runs on an operating system in conjunction with a computer system and in connection with a server, those skilled in the art will recognize that the invention also may be implemented in combination with other program modules. Generally, program modules include routines, operating systems, application programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like.

The invention may also be practiced in distributed computing environments where tasks are performed by remote processing devices that are linked through a communications network. In a distributed computing environment, program modules may be located in both local and remote memory storage devices. Execution of the program modules may occur locally in a stand-alone manner or remotely in a client/server manner. Examples of such distributed computing environments include local area networks of an office, enterprise-wide computer networks, and the Internet.

For a better understanding of the present invention, please refer now to FIG. 2. FIG. 2 is a high-level flowchart of the method in accordance with an embodiment of the present invention. First, a proxy server within a network is monitored, via step 210. In an embodiment, the proxy server includes a prefetch engine. Next, the prefetch engine is adaptively tuned to prefetch a plurality of objects from within the network, via step 220. For the purposes of this patent application, the term adaptively is defined as readily capable of changing so as to become suitable to a new set of conditions. Because the prefetch engine is adaptively tuned, the prefetch process is optimized, thereby reducing the number of idle cycles that would otherwise be required to retrieve objects from the network.

Figure 1:
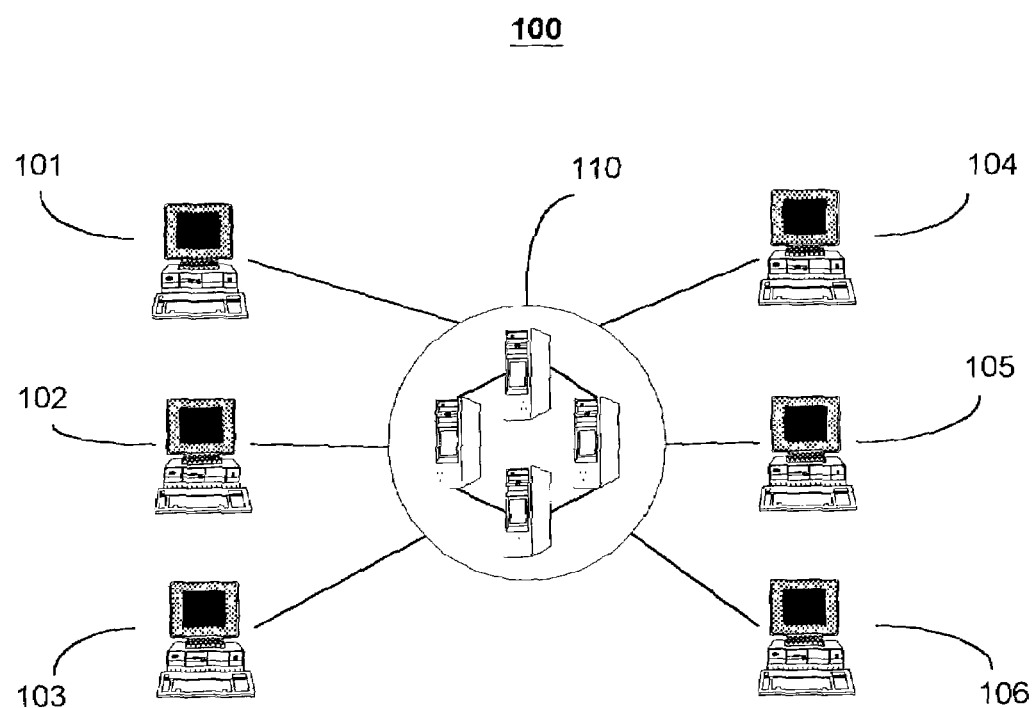
FIG. 1 shows a conventional client/server computer network.
Figure 3:
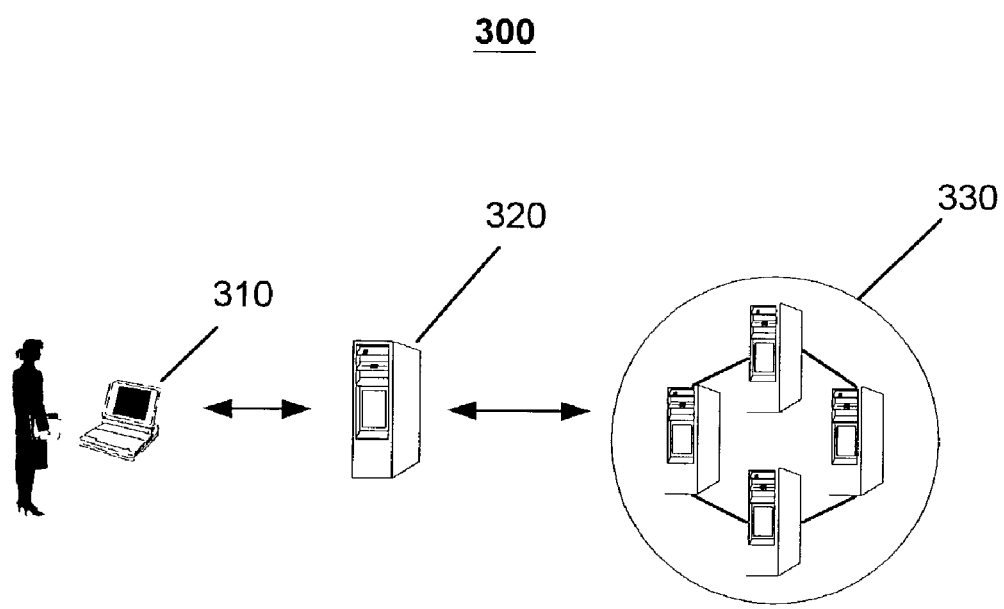
FIG. 3 shows an exemplary system in accordance with an embodiment of the present invention.

FIG. 3 shows an exemplary system 300 in accordance with an embodiment of the present invention. The system 300 includes a client system 310, a proxy server 320 and a content server 330. The client system 310 is coupled to the proxy server 320 wherein the proxy server 320 is coupled to the content server 330.

A proxy server or "application level gateway," is an application that breaks the connection between a sender and a receiver. All input is forwarded out a different port, closing a straight path between two networks thereby preventing a cracker from obtaining the internal addresses and details of a private network. Proxy servers are available for common network services. For example, an HTTP proxy is used for Web access, and an SMTP proxy is used for e-mail.

Although the above-described embodiment employs a proxy server, one of ordinary skill in the art will readily recognize that a variety of different proxy servers can be utilized while remaining within the spirit and scope of the present invention. For example, there are reverse proxies (also known as surrogates) that are placed in front of a web server or farm of web servers and present a single IP address to all clients visiting the server farm. These reverse proxies can also cache content and offload work from the server farm. Similarly there are interception proxies that are placed by ISPs and other network administrators to intercept web requests sent by their clients. Unlike forward proxies, they do not depend on the configuration of the browser or any other user agent making the request.

The system 300 in accordance with an embodiment of the present invention for adaptively prefetching objects in a network involves the implementation of adaptive, history based prefetch and replacement engines for use in conjunction with the proxy server 320 whereby objects are prefetched and replaced within the proxy cache 320 in a comprehensive and efficient fashion. A data mining engine within the proxy server 320 is employed to analyze prior usage patterns to determine which objects are likely to be requested by a client(s) system in the future while simultaneously determining the most efficient manner in which to prefetch these objects.

Data mining involves monitoring, exploring and analyzing data. It implies "digging through large amounts of data" to uncover patterns and relationships contained within the data and can be done with programs that analyze the data automatically.

Figure 4:
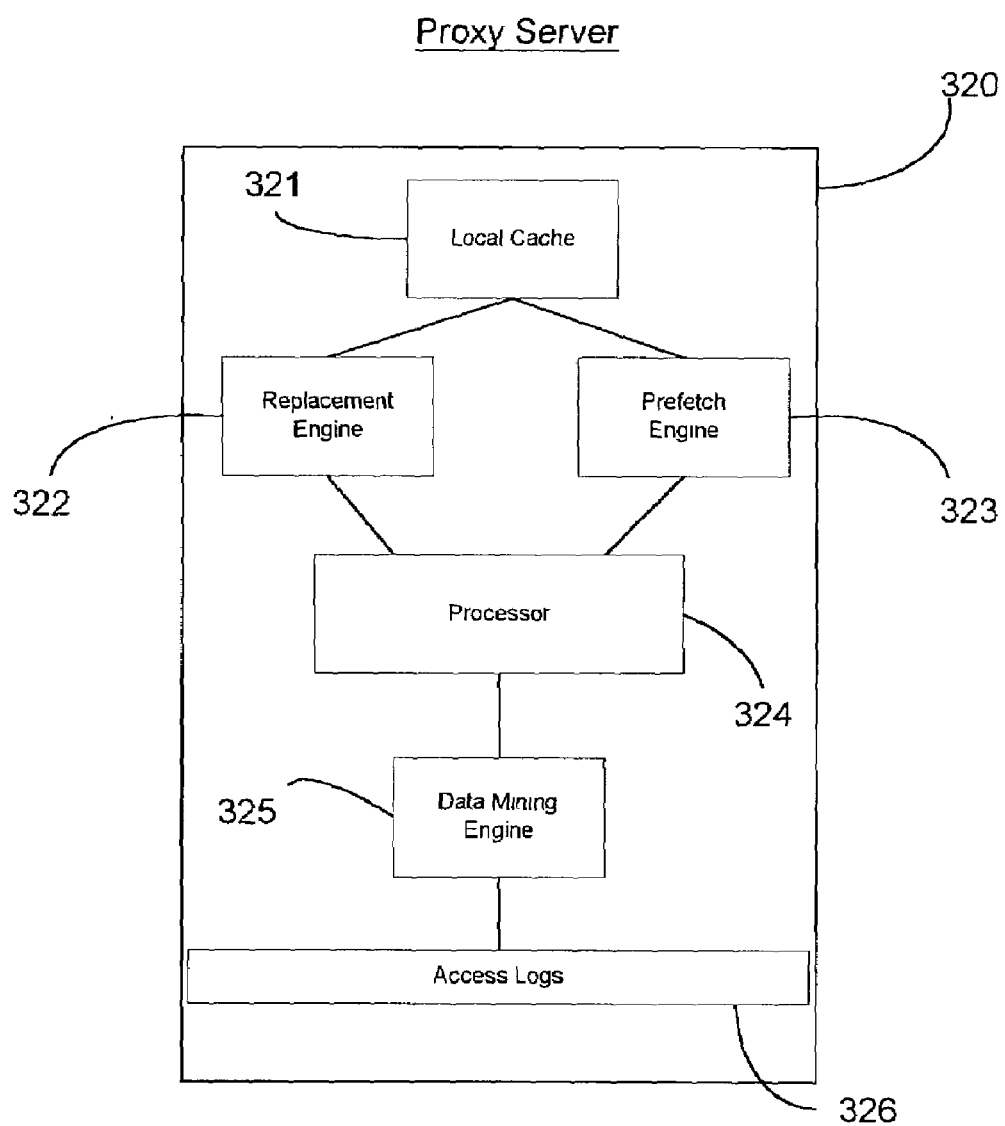
FIG. 4 is a detailed illustration of a proxy server in accordance with an embodiment of the present invention.

For a more detailed understanding of the proxy server, please refer now to FIG. 4. FIG. 4 is a detailed illustration of a proxy server 320 in accordance with an embodiment of the present invention. The proxy server 320 includes a local cache 321, a replacement engine 322, a prefetch engine 323, a processor 324, a data mining engine 325 and a plurality of access logs 326. The replacement engine 322 and the prefetch engine 323 are coupled to the processor 324 and the local cache 321 wherein the processor 324 is coupled to the data mining engine 325. The data mining engine 325 is coupled to the plurality of access logs 326.

In particular, the data mining engine 325 analyzes data contained in the plurality of access logs 326 generated within the proxy server 320. Based on the analysis, the data mining engine 325 determines what objects to prefetch from the content server into the local cache 321 with the prefetch engine 323; what objects in the local cache 321 are still of value and need to be updated; and what is no longer of value and can be replaced by the replacement engine 322. What the prefetch engine 323 prefetches can be based, for example, on links present in an already requested web page, on patterns of recent accesses to web pages and streaming media objects, on user profiles, on past trends, etc.

Although the above-described embodiment employs data mining to analyze the plurality of access logs, one of ordinary skill in the art will readily recognize that a variety of different analytical techniques can be employed while remaining within the spirit and scope of the present invention. For example, techniques such as On-Line Analytical Processing (OLAP) and standard SQL queries to a relational database can be utilized. This accordingly requires transforming the content from the access logs into the format required by these techniques. For example, an SQL query to a relational database requires that the content of the access logs be added to the appropriate relational tables in the database.

Please refer now to FIG. 5. FIG. 5 shows an example of a plurality of access logs 326 that can be employed by the proxy server in accordance with an embodiment of the present invention. The access logs 326 contain information about the clients whose requests to the content server has been proxied by the proxy server and served either from its dedicated local cache or from the content server. For each request, various details such as the URL requested, whether it was already present in the local cache (cache hit), the date and time of the access, number of bytes transferred and type of request from the client are placed in the logs. The logs may be generated by appending the details of requests collected in the proxy servers memory to the current file for storing access logs. A different file (or, as shown in the access logs 326, a different section of the same file) can be used for different time windows for storing the access log of the proxy server during that particular time period. The directory structures and file names follow a convention which allows the data mining engine to read the access logs 326.

In order to make the most efficient prefetch/replacement predictions, the data mining engine employs a plurality of different prefetching and replacement prediction algorithms. These algorithms are applied to a portion of the plurality of access logs and based on a comparison of the results of the application of each of these algorithms, the algorithm(s) with the best prediction is picked to prefetch/replace objects within the local cache of the proxy server.

For a further understanding of this concept, please refer now to FIG. 6. FIG. 6 is related to FIG. 5 in that it shows the access logs 326 of FIG. 5, however the access logs 326' of FIG. 6 identify two time slices (t1, t2), the time slice t1 being earlier than the time slice t2. Accordingly, the data mining engine applies each prediction algorithm to the time slice t1. The results of these prediction algorithms are then compared to the actual outcomes of time slice t2. Consequently, the algorithm(s) that achieves the most efficient prediction pattern is utilized for the real-time prefetch/replacement process. The data mining engine may conduct this evalation for different time windows such as last hour, last day, last week and so on to detect access patterns that repeat at the same time every day, every Monday, first working day of a month, and so on. As a result, the designated prefetch/replacement algorithm might change.

The prefetching and replacement algorithms can use a variety of predetermined criteria in order to make the predictions. For example, useful criteria for making prefetching predictions might be the total number of objects prefetched, the number of bytes prefetched, the usefulness of the prefetches in terms of an object hit ratio (ratio of prefetched objects actually used in time slice t2) and byte hit ratio (ratio of prefetched bytes actually used in time slice t2). Similarly, useful criteria for making replacement predictions might be the remaining lifetime of an object, the size of an object and the likelihood that the object will be needed in the near future.

As previously articulated, the data mining engine uses the information in the access log to determine when and what to prefetch. Based on an analysis of historical access data, the data mining engine can predict the content that will probably be accessed in the near future. For example, data mining techniques applied to the access logs might reveal that web pages, audio and video archives of the past day's news are accessed heavily from the news.com web site between 7 and 9 AM. To handle these accesses fast, the data mining engine might issue prefetch instructions for this content between 6 and 7 AM. These prefetches might be generated in a web-crawler which prefetches the top-level pages from news.com and follows the hyperlinks in them, issuing prefetches for each.

Similarly, during 12 to 1 PM, there might be frequent accesses to restaurant menus available at waiter.com. So these pages might be prefetched between 11:30 AM and noon. For large streaming media files, it may not be reasonable to prefetch the entire file. In that case, a prefix of the file corresponding to the first few seconds of playing time might be prefetched. This allows a response to a client's request with very low latency. Similarly, if the data mining engine determines that most future requests for a video will be for a specific format and resolution, it may prefetch only that instance.

Since the data mining engine monitors all traffic between the client system and the content server, the data mining engine knows when a pending request cannot be satisfied from the local cache of the proxy server (a so-called "demand miss"). Such demand misses result in additional bandwidth utilization by the proxy server since resources must be utilized to satisfy the request from the content server. The data mining engine responds by reducing the prefetching activity of the prefetch engine as the number of demand misses (or more properly, as the download bandwidth required to download those requested files not currently stored in local cache) increases. Thus the prefetch operation should be accorded a lower priority than retrieving a requested file from the content server in response to a demand miss, and the available system resources will be used more efficiently (and adaptively).

Conversely, even if sufficient bandwidth is available to perform additional prefetching, it may not always be an efficient usage of those resources to replace already cached files with other files obtained by additional prefetching. For example, if the current demand misses are relatively low (below a certain threshold), the number of objects prefetched (or alternatively the allocated network bandwidth) might even be reduced, since it is unlikely that any additional prefetching would produce a sufficient improvement in performance to warrant the additional effort, and could even result in a deterioration of the effectiveness of the local cache.

The data mining engine can also provide support for predictive prefetching based on current usage (either a file just recently cached in response to a demand miss, or the first request for a previously prefetched file). Based on a review of historical access data, the data mining engine may determine there is a high probability of accesses to certain related other objects following a request for a particular object and if they are not already present in the local cache, it issues prefetches for them. In some cases, such related files may be determined in advance from a prior analysis of historical information gleaned from the access logs. In other cases, the other related objects can be ascertained only from the results of a current request, for example, hyperlinks to other web pages can be used to initiate a prefetch to those other pages.

The data mining engine can also be utilized to determine how much of an object to prefetch. This is particularly applicable to streaming media files. The historical usage data can prioritize the prefetching of only a certain interval (for example, the beginning of each track), and the current usage data can trigger the prefetching of subsequent intervals only after the first interval has actually been requested, perhaps as a lower priority background task for the content server to send the rest of the track. Such an approach not only reduces the amount of data to be prefetched and the associated local storage required without any increase in latency, it also improves network performance. Similarly, for large objects, only a small fraction ("chunk") of the object is prefetched (prefix caching). The prefetched amount can be based on the storage capacity of the proxy server, the consumption rate of the client system, and/or the network bandwidth to the content server. The number of objects to prefetch can also be determined by the expected hit rates. For large expected hit rates, fewer objects with a larger chunk size are prefetched. On the other hand, for small expected hit rates, more objects with a smaller chunk size would be prefetched.

Exemplary Prefetch Procedure

Step 1

Using the access log data, a table is created which gives content access variations with time-of-day for a weekday or Saturday or Sunday:

| Time Interval | List of URLs |
|---|---|
| 7 am–10 am | URL1, URL2, URL3, ... |
| 10 am–1 pm | URLa, URLb, URLc, ... |
| 1 pm–5 pm | URLx, URLy, ... |

The table lists, for different times of day, the content that was accessed with a frequency greater than some threshold. To create this table for a weekday, all entries in the access logs for weekdays could be considered for the previous week, previous month or several months. Whether to consider the previous week or previous month will depend on feedback of how accurate the prefetch is for each case.

Step 2

The access log data may also be used to identify association rules which could be in formats such as:

A,B,C,D→E

According to this rule, if the client has requested URLs A, B, C and D, it is highly likely that the next request will be for E. Therefore, E is a good candidate for prefetch.

(w, X)(U, V, Y, Z)

According to this clustering rule, there is a strong correlation between accesses to W and X. So if either is requested by the client, the proxy server should consider the other as a candidate for prefetch. Similarly if any one of U, V, Y and Z is accessed by the client, the proxy should consider the other 3 as candidates for prefetch. These rules are not exhaustive. Others will be evident to those skilled in the art.

Step 3

Create a table that indicates activity during different hours of the day:

| Time Interval | Requests per second |
|---|---|
| 4 am–7 am | 0.1 |
| 7 am–10 am | 5.5 |
| 10 am–1 pm | 2.1 |
| 1 pm–5 pm | 1.3 |
| 5 pm–7 pm | 6.1 |
| 7 pm–10 pm | 3.1 |

For each time interval, the average is obtained for the number of requests per second. This gives an estimate of the traffic from the various clients.

Step 4

The activity level table from Step 3 may be used to schedule prefetches during time intervals such as 4 am to 7 am, when requests per second is low and hence network traffic is low. The content to be prefetched is determined by the usage table in Step 1. The prefetch is issued only if the content is not already present in the proxy server. Depending on the storage capacity of the proxy server, only a subset of the URLs for that time interval could possibly be prefetched. In that case, the URLs can be prioritized based on criteria such as the average expected latency of the origin server for that URL. This criterion can be evaluated based on the access logs, or it can be estimated based on number of network hops to the origin servers. More network hops would imply higher latency.

Step 5

In addition to the scheduled prefetches, prefetching can be done using the rules derived in Step 2. Accordingly, if the proxy server gets a request for URL X, it can check, in accordance with the clustering rule of Step 2, whether the associated URL W is present anywhere in the storage hierarchy. If not, it can send a request to origin server of W. If the round-trip latency from the proxy server to origin server is A milliseconds, and the request for W from client comes to the proxy server after B milliseconds, client will witness only (A−B) milliseconds of this latency if A>B, and none if B>=A.

Step 6

In either Step 4 or Step 5, if the URL to be prefetched is streaming media (such as MPEG file) rather than static content (HTML text with embedded images), then it should be treated as a special case since the user experience is different. For static content, the entire content is downloaded and presented as a single page view to the user. For streaming media, the user can pause, abort, stop or fast forward. These VCR-like controls are communicated to the streaming media server running on the proxy server. The server then generates an access log. Using data mining techniques, the segments of the streaming media that are frequently watched can then be identified. For example, a client might watch the first minute of a news broadcast to get the headlines and then fast forward or index into the business or sports sections of the news. Accordingly, the first few minutes can be cached along with the business and sports sections. If a client seems to be watching beyond the first minute, there is a possibility that he will continue. In that case, prefetches may be issued by the proxy server for subsequent segments of the news broadcast as the client continues watching.

Exemplary Replacement Procedure

The proxy server periodically evicts content from its local cache. The replacement procedure accordingly has some tunable parameters:

H is the higher threshold for disk space utilization by the local cache.

L is the lower threshold for disk space utilization by the local cache.

V is the value of the URL. The idea is to retain more valuable content in the local cache. V may be based on the frequency of access, time of most recent access, time left for expiration (as set by the origin server), and/or other hybrid parameters.

In each replacement run, the replacement procedure performs as follows: Starting with the URL on with the lowest value V, URLs are deleted from the local cache one by one, until the disk space utilization falls to the lower threshold L.

For example, suppose H is 95% and L is 85%. As soon as the local cache occupancy reached 95%, this replacement procedure will run, and will keep evicting content from the local cache until the cache occupies less than 85% of the available space. By tuning H and L, the frequency with which the replacement procedure runs and the amount of work done in each run can be controlled.

The replacement procedure keeps most of the URLs present in the local cache in a list ordered by V, so that the potential candidates for replacement can be selected quickly.

The replacement procedure skips those URLs which are locked in the local cache for expected use later in the day. Locking is done in connection with prefetches scheduled when network traffic is low (such as during 5 to 7 am), for which the content is expected to be heavily utilized during a predictable subsequent busy period (7 to 10 am). The scheduled prefetch could lock the URL until the expected termination of the period of heavy use (10 am). Alternatively, it could be locked until shortly after the expected beginning of the heavy usage period (say 8 am). In that case, if the prefetch prediction is accurate, there will be enough accesses by 8 am to ensure that it will not be replaced as long as it remains heavily accessed. However if the prefetch turns out to be a misprediction, after 8 am, the URL will get evicted. Since the replacement procedure has to skip the locked URLs, those locked URLs are preferably maintained in a list separate from the original list and are added to the original list only after they have been unlocked and are possible candidates for eviction.

Accordingly, through the implementation of the above-described features, the proxy server in accordance with an embodiment of the present invention comprehensively determines what objects to prefetch, how many objects to prefetch, when to prefetch these objects, how much of each object to prefetch, and when to replace objects. As a result, a global framework is provided for optimizing the multiple conflicting requirements present in media and web caching proxy servers.

The invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine readable instructions executable by a digital data processor to perform the method in accordance with an embodiment of the present invention.

This computer readable media may comprise, for example, RAM (not shown) contained within the system. Alternatively, the instructions may be contained in another computer readable media such as a magnetic data storage diskette and directly or indirectly accessed by the computer system. Whether contained in the computer system or elsewhere, the instructions may be stored on a variety of machine readable storage media, such as a DASD storage (for example, a conventional "hard drive" or a RAID array), magnetic tape, electronic read-only memory, an optical storage device (for example, CD ROM, WORM, DVD, digital optical tape), paper "punch" cards, or other suitable computer readable media including transmission media such as digital, analog, and wireless communication links. In an illustrative embodiment of the invention, the machine-readable instructions may comprise lines of compiled C, C++, or similar language code commonly used by those skilled in the programming for this type of application arts.

A method and system for adaptively prefetching objects from a network has been disclosed. The invention includes adaptively tuning a prefetch engine to prefetch a plurality of objects from within the network. Because the prefetch engine is adaptively tuned, the prefetch process is optimized, thereby reducing the number of idle cycles that would otherwise be required to retrieve objects from the network.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for adaptively prefetching objects from within a network via at least one proxy server comprising:
using a data mining engine to monitor the at least one proxy server within the network, the at least one proxy server comprising a prefetch engine;
automatically providing a plurality of prefetch algorithms wherein each of the plurality of prefetch algorithms predicts which of a plurality of objects should be prefetched; and
adaptively tuning the prefetch engine to prefetch the plurality of objects from within the network based on the prefetch algorithms.

2. The method of claim 1 further comprising:
replacing at least one of a plurality of objects in the proxy server based on a predetermined set of criteria.

3. The method of claim 2 wherein the predetermined set of criteria comprises a remaining lifetime of an object, a size of an object and a likelihood that the object will be needed in the near future.

4. The method of claim 1 wherein the at least one proxy server includes a plurality of access log files and monitoring the at least one proxy server comprises:
data mining the plurality of access log files.

5. The method of claim 4 wherein adaptively tuning the prefetch engine comprises:
determining what objects to prefetch;
determining when to prefetch the objects;
determining how many objects to prefetch; and
determining how much of each object to prefetch.

6. The method of claim 5 wherein the act of determining what objects to prefetch further comprises:
generating a list of objects based on the number of hits of each object; and
selecting objects from the list as prefetch candidates wherein objects with a higher number of hits are given a higher priority for prefetch.

7. The method of claim 5 wherein determining when to prefetch the objects further comprises:
allocating an amount of bandwidth available to the proxy server for storing prefetched objects wherein the amount of bandwidth is based on an amount of bandwidth not being utilized to service demand misses;
prefetching a plurality of objects into the proxy server when the allocated amount of bandwidth reaches a predetermined threshold; and
suspending the prefetching when a cache hit rate exceeds a predetermined threshold.

8. The method of claim 5 wherein determining how many objects to prefetch is based on an expected hit rate of objects being transmitted via the at least one proxy server.

9. The method of claim 5 wherein the act of determining how much of each object to prefetch is based on a predetermined set of criteria.

10. The method of claim 9 wherein the predetermined set of criteria comprises a storage capacity of the proxy server, a consumption rate of a client system and a bandwidth of a content server.

11. The method of claim 1 wherein the act of adaptively tuning the prefetch engine to prefetch a plurality of objects from within the network further comprises:
selecting one of the plurality of prefetch algorithms to be utilized by the prefetch engine.

12. The method of claim 11 wherein the act of selecting one of the plurality of prefetch algorithms to be utilized by the prefetch engine further comprises:
   comparing the predictions of each of the plurality of prefetch algorithms for a time t1 with actual prefetch results for a time t2; and
   selecting one of the plurality of prefetch algorithms based on the comparison.

13. A system for adaptively prefetching objects from within a network via at least one proxy server comprising:
   a data mining engine for monitoring the at least one proxy server within the network, the at least one proxy server comprising a prefetch engine;
   means for automatically providing a plurality of prefetch algorithms wherein each of the plurality of prefetch algorithms predicts which of the plurality of objects should be prefetched; and
   means for adaptively tuning the prefetch engine to prefetch a plurality of objects from within the network based on the prefetch algorithms.

14. The system of claim 13 further comprising:
   a replacement engine for replacing at least one of a plurality of objects in the at least one proxy server based on a predetermined set of criteria.

15. The system of claim 14 wherein the predetermined set of criteria comprises a remaining lifetime of an object, a size of an object and a likelihood that the object will be needed in the near future.

16. The system of claim 13 wherein the at least one proxy server includes a plurality of access log files and the means for monitoring the at least one proxy server comprises:
   a data mining engine for data mining the plurality of access log files.

17. The system of claim 16 wherein the means for adaptively tuning the prefetch engine comprises:
   means for determining what objects to prefetch;
   means for determining when to prefetch the objects;
   means for determining how many objects to prefetch; and
   means for determining how much of each object to prefetch.

18. The system of claim 17 wherein the means for determining what objects to prefetch further comprises:
   means for generating a list of objects based on the number of hits of each object; and
   means for selecting objects from the list as prefetch candidates wherein objects with a higher number of hits are given a higher priority for prefetch.

19. The system of claim 13 wherein the means for adaptively tuning the prefetch engine to prefetch a plurality of objects from within the network further comprises:
   means for selecting one of the plurality of prefetch algorithms to be utilized by the prefetch engine.

20. The system of claim 19 wherein the means for selecting one of the plurality of prefetch algorithms to be utilized by the prefetch engine further comprises:
   means for comparing the predictions of each of the plurality of prefetch algorithms for a time t1 with actual prefetch results for a time t2; and
   means for selecting one of the plurality of prefetch algorithms based on the comparison.

21. A network proxy server comprising:
   a prefetch engine for prefetching a plurality of objects from within the network;
   means for allocating an amount of bandwidth available to the proxy server for storing prefetched objects wherein the amount of bandwidth is based on an amount of bandwidth not being utilized to service demand misses;
   a replacement engine for replacing at least one of a plurality of objects in the proxy server based on a predetermined set of criteria; and
   a data mining engine capable of adaptively tuning the prefetch engine to prefetch a plurality of objects from within the network,
   wherein the prefetch engine is activated when the allocated amount of bandwidth reaches a predetermined threshold and suspended when a cache hit rate exceeds a predetermined threshold.

22. The network proxy server of claim 21 wherein the predetermined set of criteria comprises a remaining lifetime of an object, a size of an object and a likelihood that the object will be needed in the near future.

23. The network proxy server of claim 22 wherein the data mining engine further comprises:
   means for determining what objects to prefetch;
   means for determining when to prefetch the objects;
   means for determining how many objects to prefetch; and
   means for determining how much of each object to prefetch.

24. The network proxy server of claim 23 wherein the means for determining what objects to prefetch further comprises:
   means for generating a list of objects based on the number of hits of each object; and
   means for selecting objects from the list as prefetch candidates wherein objects with a higher number of hits are given a higher priority for prefetch.

25. The network proxy server of claim 21 further comprising:
   a plurality of prefetch algorithms within the prefetch engine wherein each of plurality of prefetch algorithms predicts which of the plurality of objects should be prefetched; and
   means for selecting one of the plurality of prefetch algorithms to be utilized by the prefetch engine.

26. The network proxy server of claim 25 wherein the means for selecting one of the plurality of prefetch algorithms to be utilized by the prefetch engine further comprises:
   means for comparing the predictions of each of the plurality of prefetch algorithms for a time t1 with actual prefetch results for a time t2; and
   means for selecting one of the plurality of prefetch algorithms based on the comparison.

27. A method for adaptively prefetching objects from within a network via a proxy server comprising;
   monitoring the proxy server within the network, the proxy server comprising a prefetch engine;
   allocating an amount of bandwidth available to the proxy server for storing prefetched objects wherein the amount of bandwidth is based on an amount of bandwidth not being utilized to service demand misses; and
   adaptively tuning the prefetch engine to prefetch a plurality of objects from within the network,
   wherein the prefetch engine is activated when the allocated amount of bandwidth reaches a predetermined threshold and suspended when a cache hit rate exceeds a predetermined threshold.

28. The method of claim 27, further comprising:
   prefetching a plurality of objects into the proxy server when the adjusted amount of bandwidth reaches a predetermined threshold.

29. The method of claim 28, further comprising:

suspending the prefetching when a cache hit rate exceeds a predetermined threshold.

30. The method of claim 27 further comprising:

replacing at least one of a plurality of objects in the proxy server based on a predetermined set of criteria.

31. The method of claim 30 wherein the predetermined set of criteria comprises a remaining lifetime of an object, a size of an object and a likelihood that the object will be needed in the near future.

32. The method of claim 27 wherein the proxy server includes a plurality of access log files and monitoring the proxy server comprises: data mining the plurality of access log files.

33. The method of claim 32 wherein adaptively tuning the prefetch engine comprises:
    determining what objects to prefetch;
    determining when to prefetch the objects;
    determining how many objects to prefetch; and
    determining how much of each object to prefetch.

* * * * *